(12) United States Patent
Wu

(10) Patent No.: US 12,592,167 B2
(45) Date of Patent: Mar. 31, 2026

(54) CURVATURE VARIABLE DEVICE

(71) Applicant: InnoLux Corporation, Miao-Li County (TW)

(72) Inventor: Yuan-Lin Wu, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/642,849

(22) Filed: Apr. 23, 2024

(65) Prior Publication Data

US 2024/0274040 A1     Aug. 15, 2024

Related U.S. Application Data

(60) Continuation of application No. 17/231,024, filed on Apr. 15, 2021, now Pat. No. 11,996,015, which is a division of application No. 16/293,597, filed on Mar. 5, 2019, now Pat. No. 11,004,363.

(51) Int. Cl.
| | |
|---|---|
| *G09F 9/30* | (2006.01) |
| *G06F 1/16* | (2006.01) |
| *G09G 3/20* | (2006.01) |

(52) U.S. Cl.
CPC ............ *G09F 9/301* (2013.01); *G06F 1/1652* (2013.01); *G09G 3/2074* (2013.01)

(58) Field of Classification Search
CPC .......... G09F 9/301; G09F 9/33; G06F 1/1652; G09G 3/2074; G09G 3/035; G09G 5/10; G09G 2320/0626; G09G 2320/0686;

G09G 2320/08; G09G 3/32; Y02E 10/549; H01L 27/156; H01L 33/20; H10K 59/12; H10K 77/111
See application file for complete search history.

(56) References Cited

U.S. PATENT DOCUMENTS

| | | | | |
|---|---|---|---|---|
| 9,391,286 B1 * | 7/2016 | Kwon | ................... | H10K 50/858 |
| 10,910,316 B2 * | 2/2021 | Wu | ......................... | H05K 1/189 |
| 2014/0098028 A1 * | 4/2014 | Kwak | ................... | G06F 1/1652 |
| | | | | 345/173 |
| 2014/0300529 A1 * | 10/2014 | Kim | ...................... | H10K 59/121 |
| | | | | 345/80 |
| 2014/0361262 A1 * | 12/2014 | Kim | ........................ | G09G 3/035 |
| | | | | 257/40 |
| 2015/0029683 A1 * | 1/2015 | Kim | ...................... | H10K 77/111 |
| | | | | 361/749 |
| 2015/0192952 A1 * | 7/2015 | Jung | ...................... | G06F 1/1601 |
| | | | | 361/747 |
| 2015/0296641 A1 * | 10/2015 | Song | .................... | H05K 5/0217 |
| | | | | 361/679.01 |
| 2016/0183364 A1 * | 6/2016 | Choi | ....................... | G04G 21/08 |
| | | | | 361/679.01 |
| 2016/0217551 A1 * | 7/2016 | Kim | ......................... | G06T 3/08 |

(Continued)

*Primary Examiner* — Dmitriy Bolotin
(74) *Attorney, Agent, or Firm* — Winston Hsu

(57) ABSTRACT
A curvature variable device includes a curvature variable substrate and a display layer disposed on the curvature variation substrate. The first average luminance is different from the second average luminance. The curvature variable device is configured to have a first average luminance when operated in a first display status, and is configured to have a second average luminance when operated in a second display status. The curvature variable device includes at least one curved portion when operated in the second display status.

11 Claims, 15 Drawing Sheets

(56)          References Cited

U.S. PATENT DOCUMENTS

| | | | |
|---|---|---|---|
| 2017/0169759 A1* | 6/2017 | Jang | G09G 3/3406 |
| 2017/0271398 A1* | 9/2017 | Oh | H01L 25/0753 |
| 2018/0074675 A1* | 3/2018 | Soh | G06F 3/043 |
| 2018/0144667 A1* | 5/2018 | Zhang | G06F 3/0412 |
| 2019/0073946 A1* | 3/2019 | Su | H10K 50/81 |
| 2019/0146744 A1* | 5/2019 | Chun | G06F 3/1454 |
| | | | 345/592 |
| 2019/0245164 A1* | 8/2019 | Zou | G09F 9/301 |
| 2020/0073446 A1* | 3/2020 | Wu | G06V 40/13 |
| 2020/0103741 A1* | 4/2020 | Song | H04N 9/3173 |
| 2020/0168590 A1* | 5/2020 | Kim | H01L 25/04 |
| 2020/0286410 A1* | 9/2020 | Wu | G09G 3/32 |
| 2020/0343190 A1* | 10/2020 | Wu | H10K 77/111 |
| 2021/0090488 A1* | 3/2021 | Jeong | G09G 3/32 |

* cited by examiner

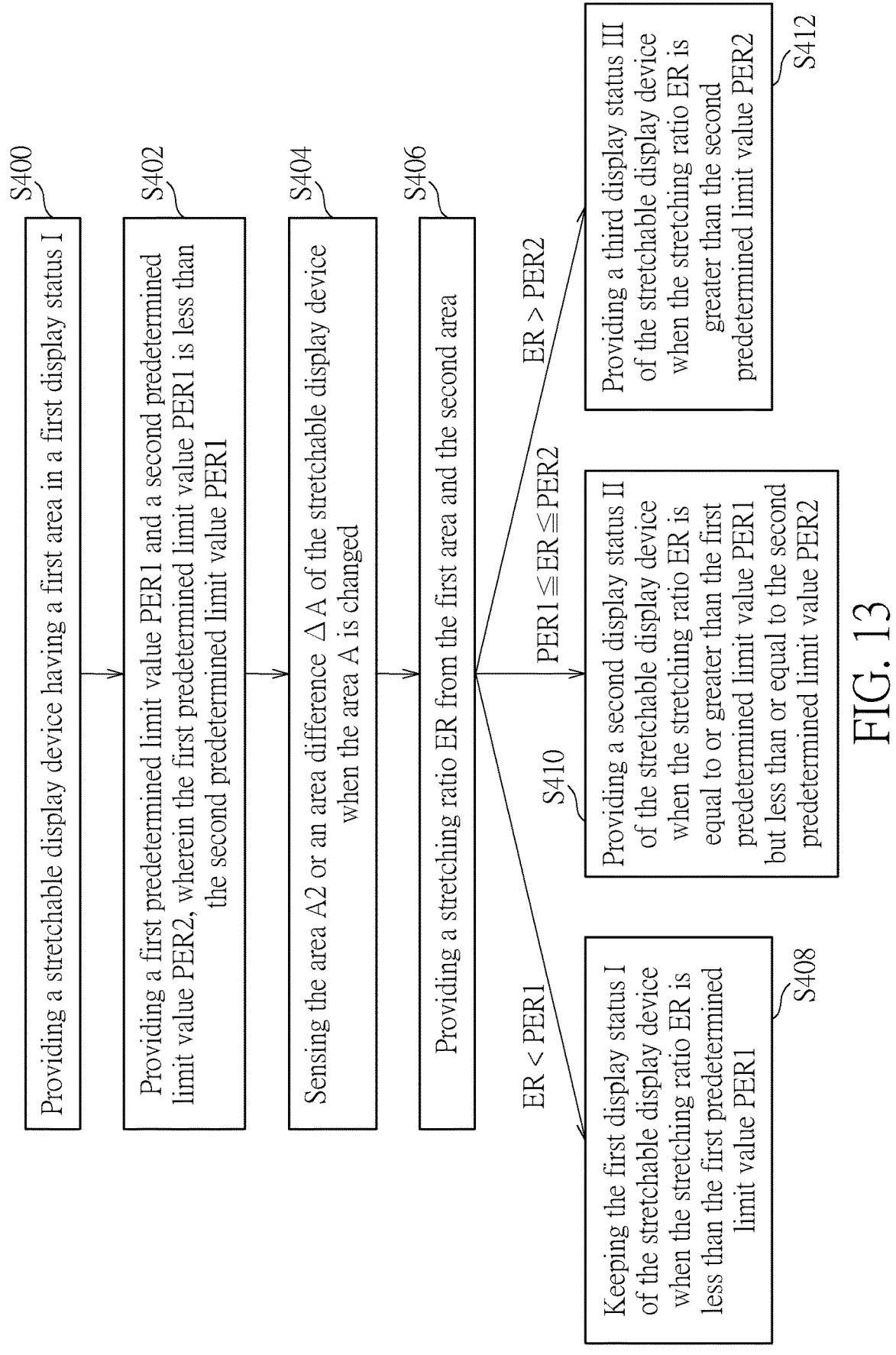

S400

Providing a stretchable display device having a first area in a first display status I

S402

Providing a first predetermined limit value PER1 and a second predetermined limit value PER2, wherein the first predetermined limit value PER1 is less than the second predetermined limit value PER1

S404

Sensing the area A2 or an area difference △A of the stretchable display device when the area A is changed

S406

Providing a stretching ratio ER from the first area and the second area

ER < PER1

PER1 ≦ ER ≦ PER2

ER > PER2

S408

Keeping the first display status I of the stretchable display device when the stretching ratio ER is less than the first predetermined limit value PER1

S410

Providing a second display status II of the stretchable display device when the stretching ratio ER is equal to or greater than the first predetermined limit value PER1 but less than or equal to the second predetermined limit value PER2

S412

Providing a third display status III of the stretchable display device when the stretching ratio ER is greater than the second predetermined limit value PER2

FIG. 13

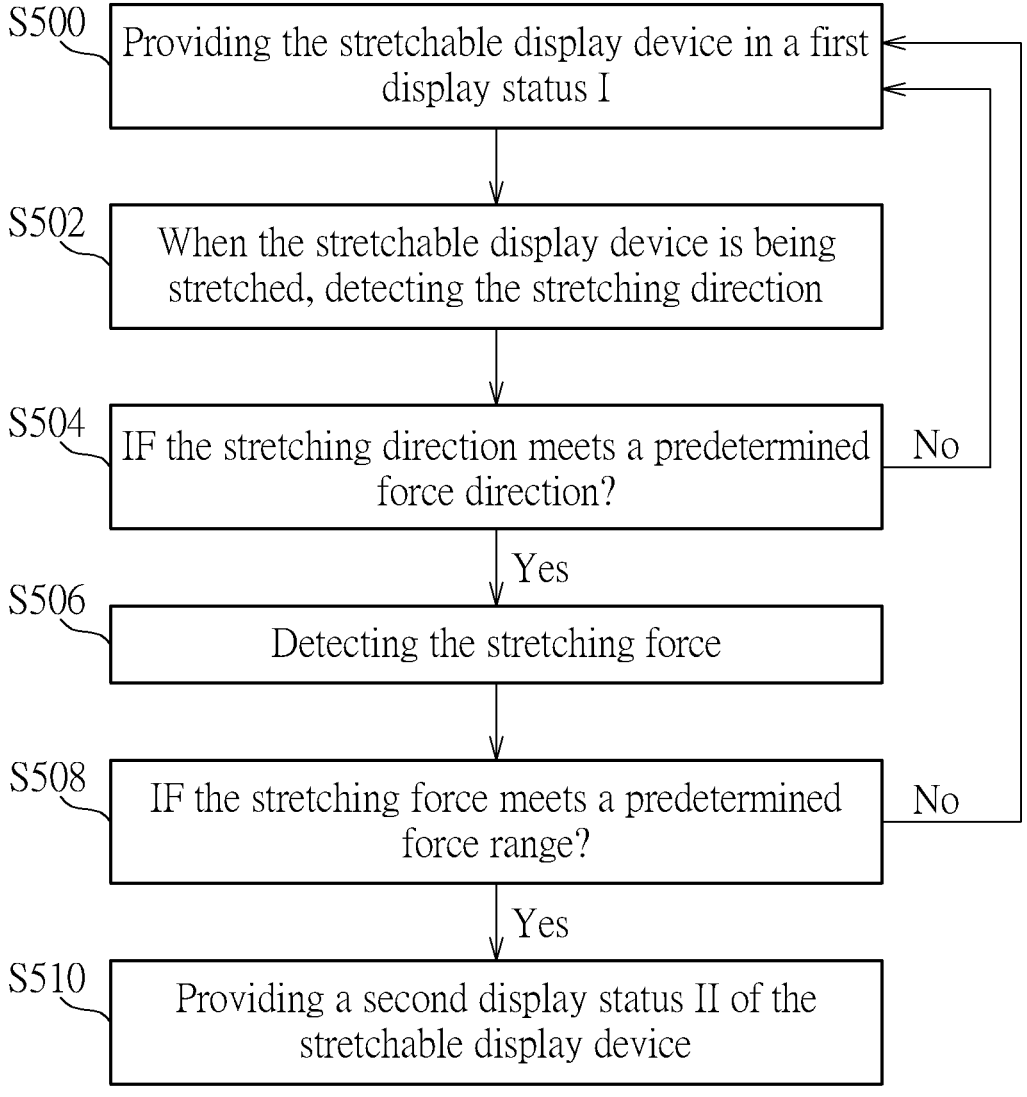

S500 — Providing the stretchable display device in a first display status I

S502 — When the stretchable display device is being stretched, detecting the stretching direction S504 — IF the stretching direction meets a predetermined force direction?     No Yes S506 — Detecting the stretching force S508 — IF the stretching force meets a predetermined force range?     No Yes S510 — Providing a second display status II of the stretchable display device

FIG. 15

CURVATURE VARIABLE DEVICE

CROSS REFERENCE TO RELATED APPLICATIONS

This application is a continuation application of U.S. application Ser. No. 17/231,024, filed on Apr. 15, 2021, which is a division of U.S. application Ser. No. 16/293,597, filed on Mar. 5, 2019. The contents of these applications are incorporated herein by reference.

BACKGROUND OF THE DISCLOSURE

1. Field of the Disclosure

The present disclosure is related to a stretchable display device and related controlling method, and more particularly, to a stretchable display device that the average luminance can be adjusted and related controlling method.

2. Description of the Prior Art

In recent years, display devices have become more and more important for being applied to various applications, such as smartphones, tablet computers, notebooks, and electronic book readers, and wearable devices, such as smart watches. The manufacturers still keep on developing new types of display devices.

SUMMARY OF THE DISCLOSURE

One of the objectives of the present disclosure is to provide a stretchable display device and related controlling method with a good perception of human eyes.

According to an embodiment, a curvature variable device is provided. The curvature variable device includes a curvature variable substrate and a display layer disposed on the curvature variation substrate. The first average luminance is different from the second average luminance. The curvature variable device is configured to have a first average luminance when operated in a first display status, and is configured to have a second average luminance when operated in a second display status. The curvature variable device includes at least one curved portion when operated in the second display status.

According to an embodiment, a stretchable display device is provided. The stretchable display device includes: a stretchable substrate and a display layer disposed on the stretchable substrate. The display layer is capable of being stretched from a first area to a second area. The stretchable display device has a first average luminance when the display layer has the first area and a second average luminance when the display layer has the second area. The second average luminance is greater than the first average luminance.

According to an embodiment, a method of controlling a stretchable display device is provided. The stretchable display device includes a stretchable substrate and a display layer disposed thereon, and the display layer having a first area when the stretchable substrate is not stretched. The method includes the following steps:

providing a first predetermined limit value;

providing a second area of the display layer when the stretchable substrate is stretched;

providing a stretching ratio from the first area and the second area;

providing a first display status of the stretchable display device when the stretching ratio is less than the first predetermined limit value; and providing a second display status of the stretchable display device when the stretching ratio is equal to or greater than the first predetermined limit value, wherein the first display status is different from the second display status.

These and other objectives of the present disclosure will no doubt become obvious to those of ordinary skill in the art after reading the following detailed description of the embodiment that is illustrated in the various figures and drawings.

BRIEF DESCRIPTION OF THE DRAWINGS

FIG. 13 is a flow chart showing a method of controlling the stretchable display device according to an eighth embodiment of the present disclosure.

FIG. 15 is a flow chart showing a method of controlling the stretchable display device according to a ninth embodiment of the present disclosure.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the display device, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ".

It will be understood that when an element or layer is referred to as being "on" or "connected to" another element or layer, it can be directly on or directly connected to the other element or layer, or intervening elements or layers may be presented. In contrast, when an element is referred to as being "directly on" or "directly connected to" another element or layer, there are no intervening elements or layers presented.

The term "stretching/stretchable" in the present disclosure indicates that an object can be deformed when an external stress and/or force is applied thereto, and the deformation may include the variation of area, length, width, thickness, and/or curvature in any direction of the object, but not limited thereto. For example, an enlargement of the length of the object and/or a reduction of the length of the object may belong to the term "stretching/stretchable" mentioned in the present disclosure.

It should be noted that the technical features in different embodiments described in the following can be replaced, recombined, or mixed with one another to constitute another embodiment without departing from the spirit of the present disclosure.

Figure 1:
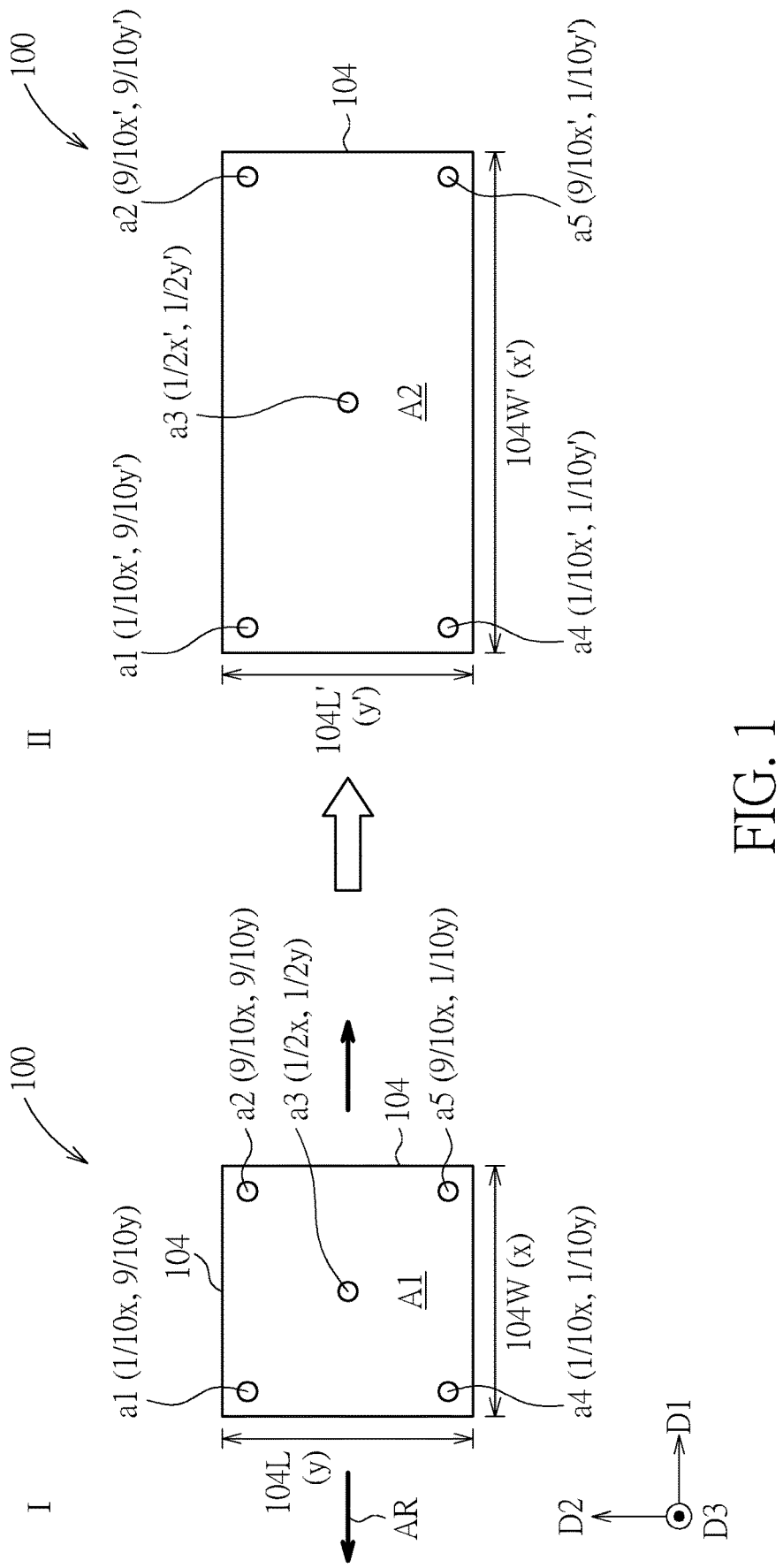
FIG. 1 is a schematic diagram illustrating different display statuses of a stretchable display device according to a first embodiment of the present disclosure.
Figure 2:
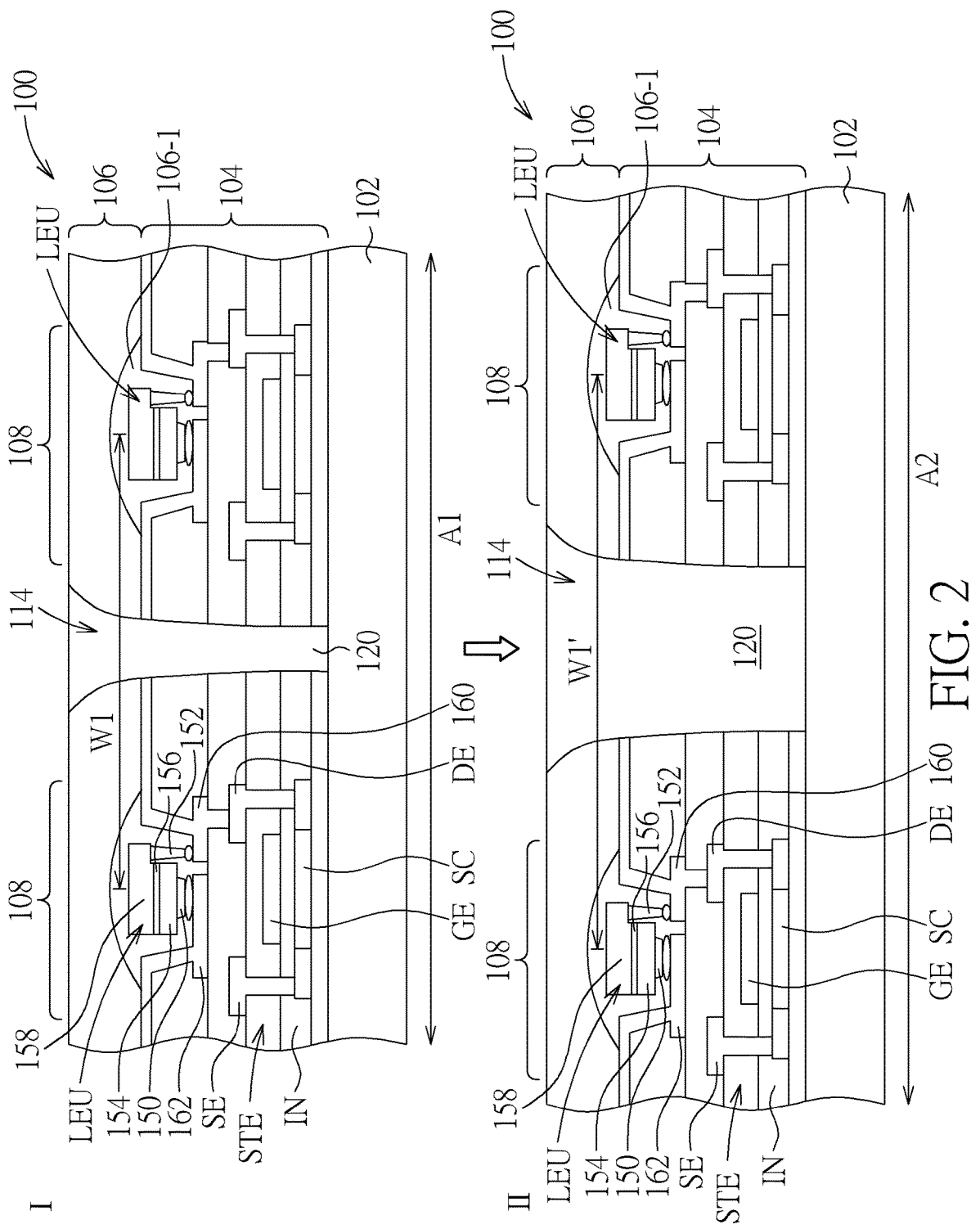
FIG. 2 is a schematic sectional-view diagram of different display statuses of the stretchable display device shown in FIG. 1.

Referring to FIG. 1 and FIG. 2, FIG. 1 is a schematic diagram illustrating different display statuses of a stretchable display device according to a first embodiment of the present disclosure, and FIG. 2 is a schematic sectional-view diagram of different display statuses of the stretchable display device shown in FIG. 1. The stretchable display device 100 of the first embodiment of the present disclosure includes a stretchable substrate 102 and a display layer 104. The display layer 104 may be disposed on the stretchable substrate 102 and may include a plurality of subpixel units 108, wires, electrodes, switch elements and/or driving elements, but not limited thereto. For example, the subpixel units 108 may include any electric elements that can produce light, such as the primary lights (red light, blue light, and green light), for display images. In some embodiments, one subpixel unit 108 may include one or more light emitting units LEU and one or more switching element STE electrically connected to the light emitting unit LEU. The display layer 104 can be stretched from a first area A1 to a second area A2. The second area A2 can be greater than the first area A1, or can be smaller than the first area A1. For easy explanation, the situation that the second area A2 is greater than the first area A1 is taken as an example in the following embodiments. A ratio of the second area A2 to the first area A1 may be greater than 1 and less than or equal to 25, but not limited thereto. The light emitting unit LEU may be a light emitting diode (LED), a mini LED, a micro LED, or an organic LED, or any other suitable elements. In some embodiments, the size of a mini-LED can be in a range from 100 µm to 300 µm. In some embodiments, the size of a micro-LED can be in a range from 1 µm to 100 µm. The switching element STE may be a thin film transistor, but not limited thereto.

In some embodiments, when a display datum of the display layer 104 is changed by stretching, the stretchable display device can be operated by a different display status. The display datum can comprise, but not limited to, dimension, dimension change, dimension ratio, ratio of dimension change, curvature, curvature change, curvature ratio, ratio of curvature change, stretching ratio, shape, or combinations thereof. For example, the dimension can be area, width, length, or combination thereof, but not limited thereto. For example, dimension ratio can refer to length-width ratio. The display status can include luminance, displayed image, display mode, turned-on/turned-off state, display shape of the image, display information, or combinations thereof, but not limited thereto. In some embodiments, when the display layer 104 has the first area A1, it is operated in a first display status I; and when the display layer 104 has the second area A2, it is operated in a second display status II, wherein the area of the display layer 104 may indicate the display datum that may regard the display status in the control method of the stretchable display device 100 as mentioned above). The first display status I is different from the second display status II. For example, in some embodiments, the stretchable display device 100 is in an off state when the display layer 104 has the first area A1 and is in an on state when the display layer 104 has the second area A2, but not limited thereto. The "off state" means the display function of the stretchable display device 100 is in a turned-off state, and the "on state" means the display function of the stretchable display device 100 is in a turned-on state.

The stretchable display device 100 may be stretched along various directions, thus the display layer 104 can stretch toward various directions and the dimensions of the display layer 104 may be changed. In detail, the display layer 104 of the stretchable display device 100 can have a width along a direction D1, a length along a direction D2, and a thickness along a direction D3, shown in FIG. 1. The direction D1 crosses the direction D2. For example, the direction D1 is perpendicular to the direction D2, and perpendicular to the direction D3. When the stretchable display device 100 is not stretched and the display layer 104 has the first area A1 (in the first display status I), the display layer 104 has a width 104W and a length 104L. In some embodiments, as shown in FIG. 1, the stretchable display device 100 can be stretched along a horizontal direction (as illustrated as the arrows AR), such as, but not limited to, parallel to the direction D1, and therefore the stretched display layer 104 having the second area A2 (in the second display status II) may have a stretched width 104W' greater than the width 104W and a stretched length 104L' approximately equal to the length 104L. In such case, the length-width ratio (a ratio of the length to the width of the area) of the first area A1 is different from the length-width ratio of the second area A2. In some embodiments, the length-width ratio of the first area A1 may be greater than the length-width ratio of the second area A2. As a result, the shape of the first area A1 is different from the second area A2. When the stretchable display device 100 is stretched along multiple directions, multiple dimensions of the display layer 104 may be changed.

Referring to FIG. 2 again, the light emitting units LEU may be a flip-type micro-LED for example. One light emitting unit LEU may include a first electrode 150, a second electrode 152, a first semiconductor layer 154, a light emitting layer 156, and a second semiconductor layer 158. The light emitting layer 156 may be, but not limited to, a multiple quantum well (MQW) layer for example. The first electrode 150 may be electrically connected to a common electrode through a bonding pad 162. In addition, when the switching element STE is a thin film transistor, it may include a gate GE, a source SE, a drain DE, and a semiconductor layer SC, wherein the source SE and the drain DE are electrically connected to the semiconductor layer SC respectively and an insulating layer IN is positioned between the gate GE and the semiconductor layer SC. The source SE may be electrically connected to a signal line for example. The drain DE may be electrically connected to a bonding pad 160 or a connecting layer that is electrically connected to the corresponding light emitting unit LEU. The stretchable display device 100 may further include a functional layer 106 covering the display layer 104. The functional layer 106 may include a touch layer, a cover layer, an anti-refection layer, a protection layer 106-1, or combinations thereof. The stretchable display device 100 may include a plurality of gaps 114 disposed in the display layer 104. In some embodiments, the stretchable display device 100 may further include a filler 120 disposed in the gaps 114. The filler 120 can be inorganic insulating material, organic insulating material, or combinations thereof. In some embodiments, the filler 120 can be elastic material or adhesive material.

According to the present disclosure, the stretchable display device 100 has a first average luminance AL1 when the display layer has the first area A1 and has a second average luminance AL2 when the display layer 104 has the second area A2, and the second average luminance AL2 is different from the first average luminance AL1. In some embodiments, the second average luminance AL2 is greater than the first average luminance AL1. The average luminance may be obtained by calculating the average value of the measured luminance of, not limited to, five dots of the stretchable display device 100. For example, the dots a1, a2, a3, a4, a5 are selected for detecting the luminance. The coordinates of these fives dots are: a1=(1/10x, 9/10y), a2=(9/10x, 9/10y), a3=(1/2x, 1/2y), a4=(1/10x, 1/10y), and a5=(9/10x, 1/10y). Before the stretchable display 100 being stretched (i.e., the stretchable display 100 is in the first display status I with the first area A1), the luminance of the five dots, a1 (1/10x, 9/10y), a2 (9/10x, 9/10y), a3 (1/2x, 1/2y), a4 (1/10x, 1/10y), and a5 (9/10x, 1/10y) are measured and the average value thereof are calculated to obtain the first average luminance AL1. After the stretchable display device 100 is stretched to the second area A2, which means the stretchable display device 100 is in the second display status II, the five dots may become: a1=(1/10x', 9/10y'), a2=(9/10x', 9/10y'), a3= (1/2x', 1/2y'), a4=(1/10x', 1/10y'), and a5=(9/10x', 1/10y), and the luminance of these dots may be measured and the average value is calculated to obtain the second average luminance AL2.

As mentioned above, the second average luminance AL2 may be greater than the first average luminance AL1 in some embodiments. For example, when the stretchable display device 100 is in the second display status II, more current may be provided to the subpixel units 108, thus the second average luminance AL2 can be greater, but not limited thereto. The average luminance can be adjusted based on the area of the display layer 104 in order to maintain the perception luminance of human eyes or to provide different functions of the stretchable display device 100, for example providing different luminance based on different requirement of different display statuses, but not limited thereto.

The variation of average luminance between the first display status and the second display status may be applied to other embodiments and variant embodiments in the following, which will not be repeated.

Referring to FIG. 2, when the stretchable display device 100 is stretched from having the first display datum (such as having a first area A1) to having the second display datum (such as having the second area A2), which means the display status of the stretchable display device 100 may be changed from the first display status I to the second display status II, the distance (or pitch) between the adjacent subpixel units 108 may be also stretched. In the first display status I, the distance between adjacent subpixel units 108 is represented as W1, wherein the distance W1 is measured from a center of a light emitting unit LEU to a center of another adjacent light emitting unit LEU. After the stretchable display device 100 is stretched to the second display status II, the adjacent light emitting units LEU have a stretched distance W1' therebetween, and the stretched distance W1' is greater than the distance W1. Further, the gap 114 between adjacent subpixel units 108 may also be widened after stretching.

Figure 3:
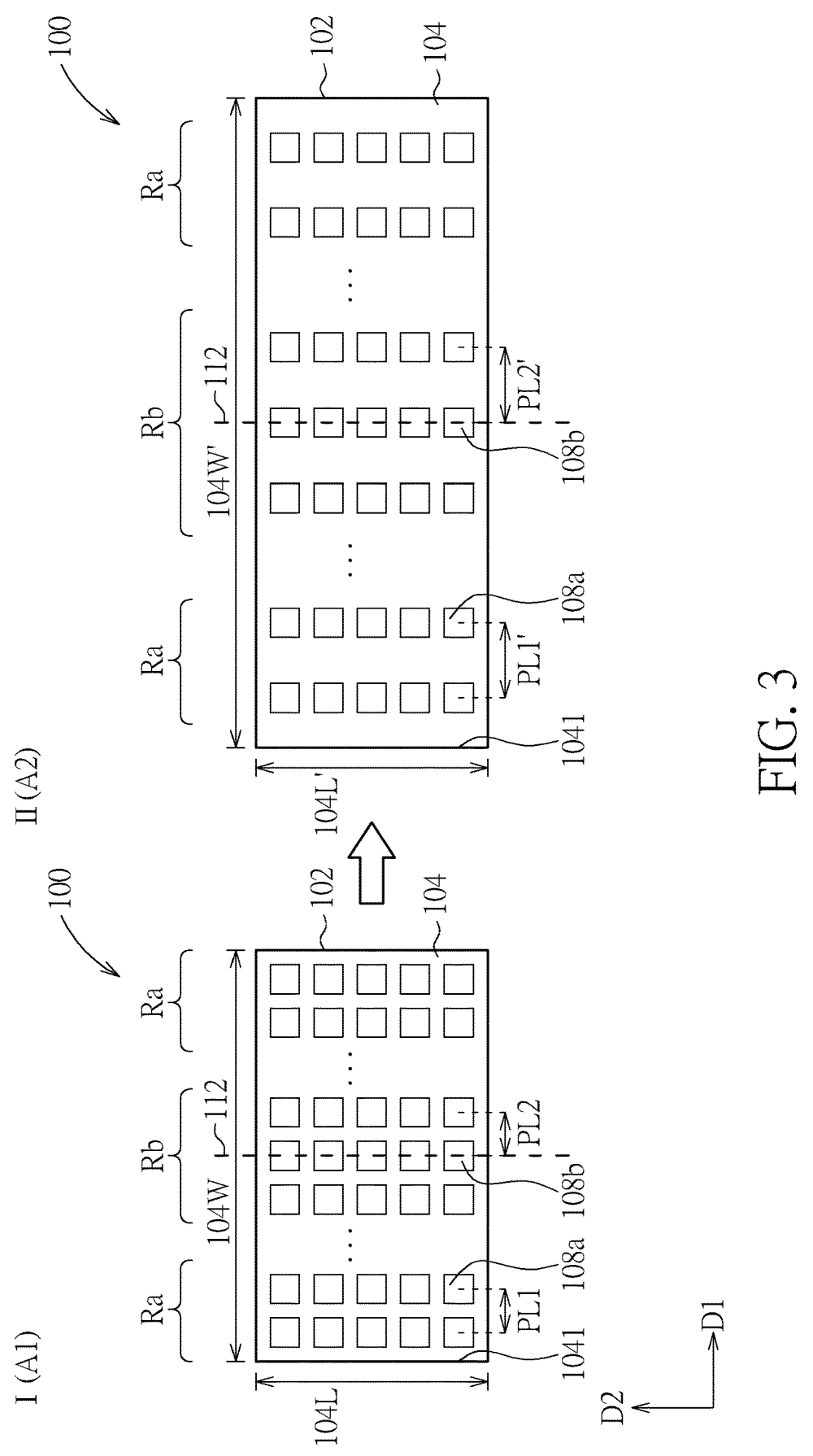
FIG. 3 is a schematic top-view diagram showing pixel units of a stretchable display according to a variant embodiment of the first embodiment of the present disclosure.

Referring to FIG. 3, FIG. 3 is a schematic top-view diagram showing pixel units of a stretchable display according to a variant embodiment of the first embodiment of the present disclosure. The display layer 104 of the stretchable display device 100 in this variant embodiment is capable of being stretched from a first width 104W to a second width 104W' along a first direction D1. The stretchable display device 100 may have at least an edge region Ra and a middle region Rb disposed along the first direction D1. The edge region Ra is near a fringe 1041 of the display layer 104. The middle region Rb is a region passed through by a central line 112 of the display layer 104. In FIG. 3, two edge regions Ra are illustrated and the middle region Rb is situated between the two edge regions Ra in the first direction D1. The display layer 104 comprises a plurality of first subpixel units 108a in the edge regions Ra and a plurality of second subpixel units 108b in the middle region Rb. In other words, the first subpixel units 108a in the left edge region Ra are closer to the fringe 1041 than the second subpixel units 108b, and the second subpixel units 108b are closer to the central line 112 than the first subpixel units 108a. Before the stretchable display device 100 is stretched or when the stretchable display device 100 has the first area A1, two of the first subpixels 108a adjacent to each other have a first distance PL1, and two of the second subpixels 108b adjacent to each other have a second distance PL2. The first distance PL1 may be the same as the second distance PL2 in some embodiments, but not limited thereto. The first distance PL1 may not be equal to the second distance PL2 in some other embodiments. In some other embodiments, the ratio of the second distance PL2 to the first distance PL1 may be in a range from 0.95 to 1.05. When the display layer 104 is stretched to have the second area A2, one of the plurality of first subpixel units 108a has a first stretched distance PL1' from an adjacent first subpixel unit 108a, one of the plurality of second subpixel units 108b has a second stretched distance PL2' from an adjacent second subpixel unit 108b, and the first stretched distance PL1' may be the same as or different from the second stretched distance PL2'. The ratio of the second stretched distance PL2' to the first stretched distance PL1' may be in a range from 0.7 to 1. As shown in FIG. 3, the above-mentioned ratio may be 1, which means the first stretched distance PL1' may be the same as the second stretched distance PL2'.

Figure 4:
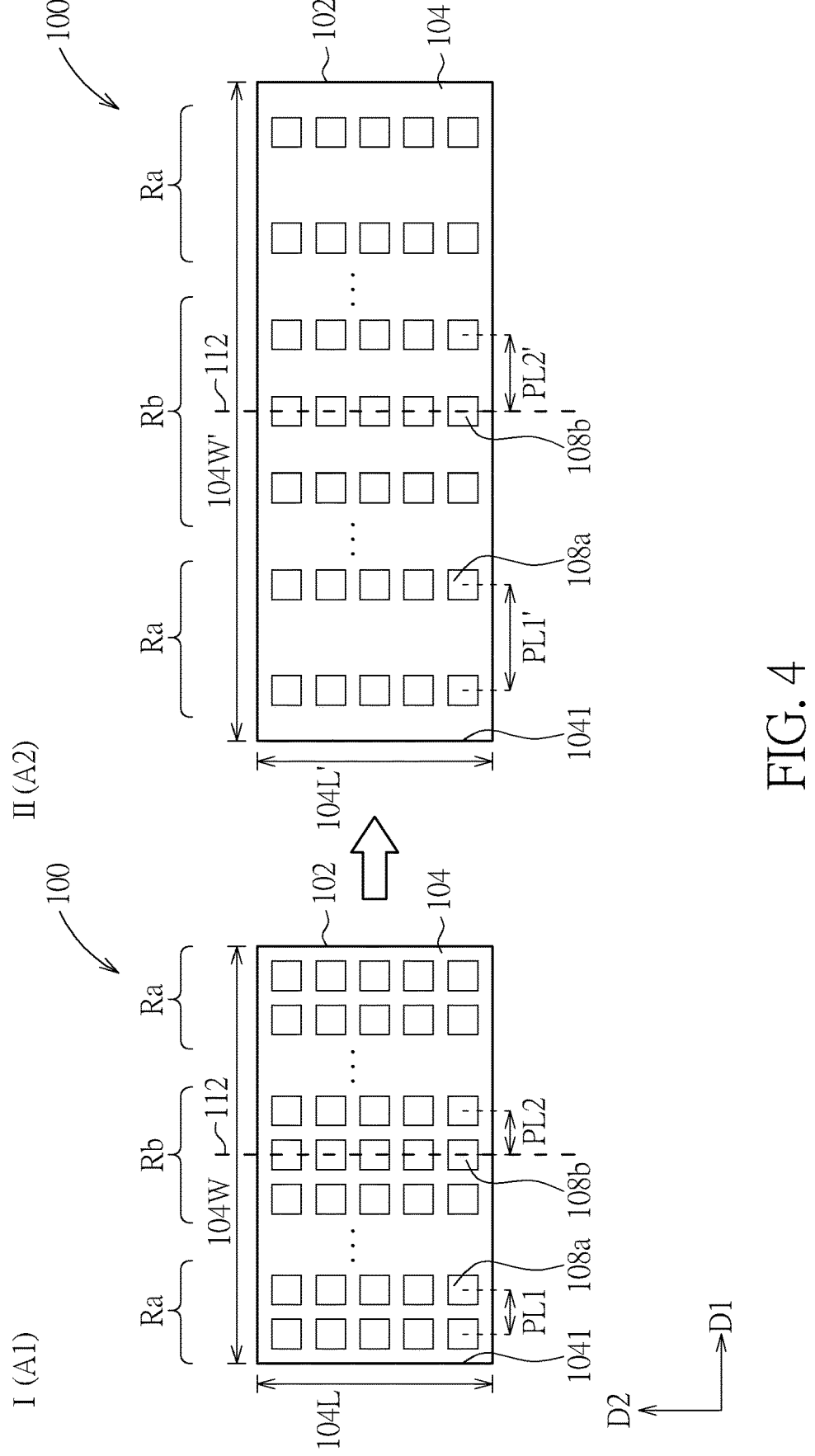
FIG. 4 is a schematic top-view diagram showing pixel units of a stretchable display according to another variant embodiment of the first embodiment of the present disclosure.

In another aspect, the variations of distances between adjacent subpixel units 108 may be different after stretching, based on their position. FIG. 4 is a schematic top-view diagram showing pixel units of a stretchable display device according to another variant embodiment of the first embodiment of the present disclosure. Referring to FIG. 4, before the stretchable display device 100 is stretched or when the stretchable display device 100 has the first area A1, one of the first subpixel units 108a in the edge region Ra may have a first distance PL1 from an adjacent subpixel unit 108a in the edge region Ra, and one of the subpixel units 108b in the middle region Rb may have a second distance PL2 from an adjacent subpixel unit 108b. When the stretchable display device 100 is stretched to have the second area A2 and in the second display status II, the distance of the subpixel units 108a in the edge region Ra and the adjacent subpixel unit 108a may become the first stretched distance PL1', and the distance of the subpixel units 108b in the middle region Rb may become the second stretched distance PL2'. In some embodiments, the first stretched distance PL1' may be greater than the first distance PL1, and the second stretched distance PL2' may be greater than the second distance PL2. In addition, the first stretched distance PL1' may be greater than the second stretched distance PL2', but not limited thereto. In some embodiments, the ratio of the second stretched distance PL2' to the first stretched distance PL1' may be in a range from 0.7 to 1, but not limited thereto. This designed range of ratio of the distances may provide a better uniformity of the arrangement of the subpixel units 108, mitigating that the display performance being affected after the stretchable display device 100 is stretched. Furthermore, a pixel (or subpixel) per inch of the first area A1 is different from a pixel (or subpixel) per inch of the second area A2.

Figure 11:
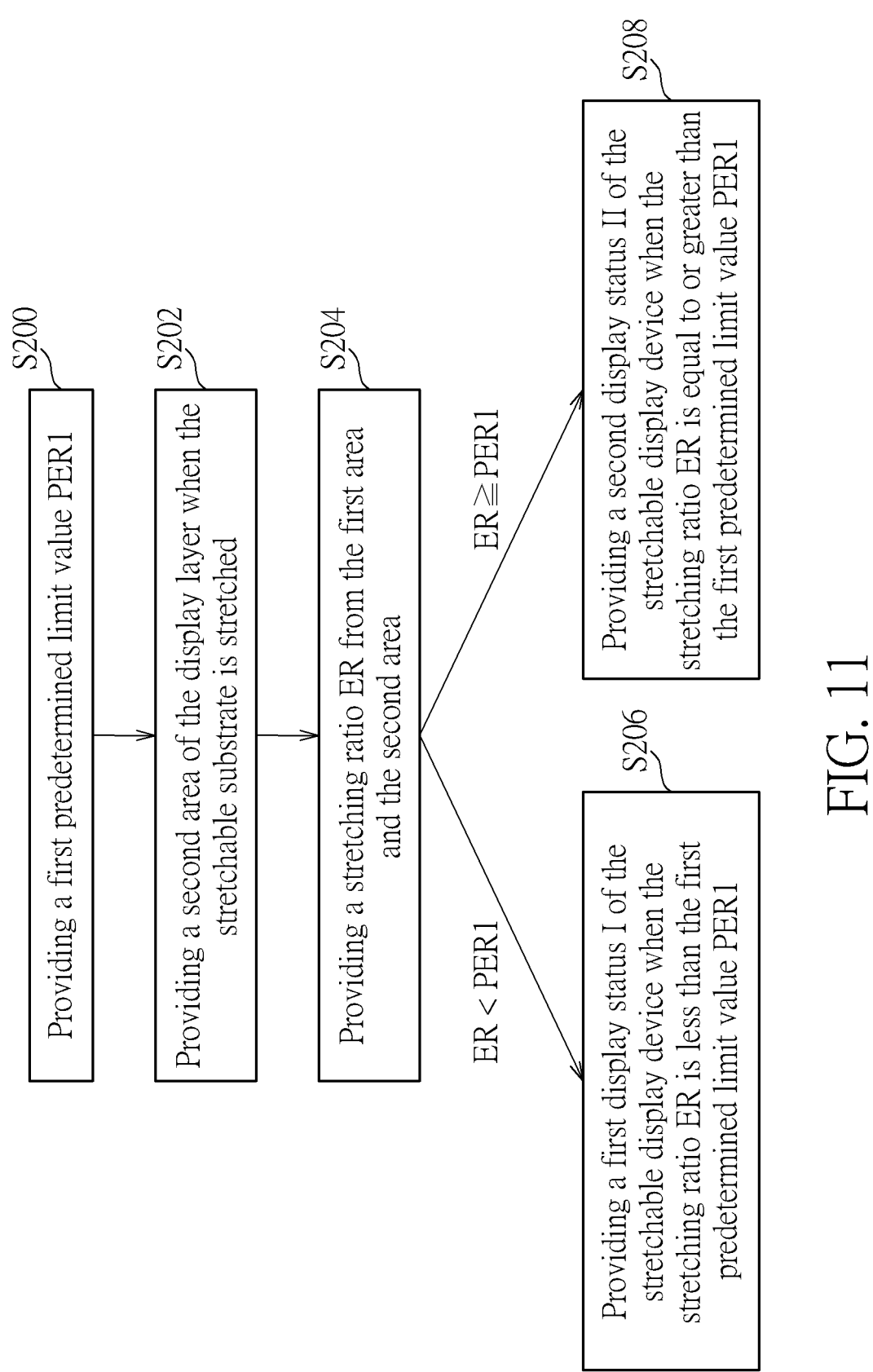
FIG. 11 is a flow chart showing a method of controlling the stretchable display device according to the first embodiment of the present disclosure.

Referring to FIG. 11, FIG. 11 is a flow chart showing a method of controlling the stretchable display device 100 according to the first embodiment of the present disclosure. The stretchable display device 100 has a stretchable substrate 102 and a display layer 104 disposed thereon. The display layer 104 has a first area A1 when the stretchable substrate 102 is not stretched. The method may include following steps:

Step S200: Providing a first predetermined limit value PER1.

Step S202: Providing a second area A2 of the display layer 104 when the stretchable substrate 102 is stretched, wherein the absolute value of the difference between the first area A1 and the second area A2 is defined as an area difference $\Delta A$ ($\Delta A=|A2-A1|$), i.e., the area difference $\Delta A$ is the "absolute difference" of the first area A1 and the second area A2.

Step S204: Providing a stretching ratio ER from the first area A1 and the second area A2, wherein the stretching ratio ER is a ratio of the area difference $\Delta A$ to the first area A1 (ER=$\Delta A$/A1).

Step S206: Providing a first display status I of the stretchable display device 100 when the stretching ratio ER is less than the first predetermined limit value PER1 (ER<PER1).

Step S208: Providing a second display status II of the stretchable display device 100 when the stretching ratio ER is equal to or greater than the first predetermined limit value PER1 (ER≥PER1), wherein the first display status I is different from the second display status II and the stretching ratio ER is calculated from the absolute difference of the first area A1 and the second area A2.

In some embodiments, the first predetermined limit value may be, but not limited to, in a range from 0.01 to 1. For example, if the first predetermined limit value is, but not limited to, 1, the stretchable display device 100 will be switched to the second display status II when the second area A2 is twice as large as the first area A1. In other words, once the stretchable display device 100 is stretched to a twice area, the stretchable display device 100 will be switched to the second display status II. In another example, if the first predetermined limit value PER1 is, but not limited to, 0.5, the stretchable display device 100 will be maintained in the first display status I when the stretching ratio ER<0.5 and will be in the second display status II when the stretching ratio ER≥ 0.5. In some embodiments, the first display status I may be an off state and the second display status II may be an on state.

Figure 12:
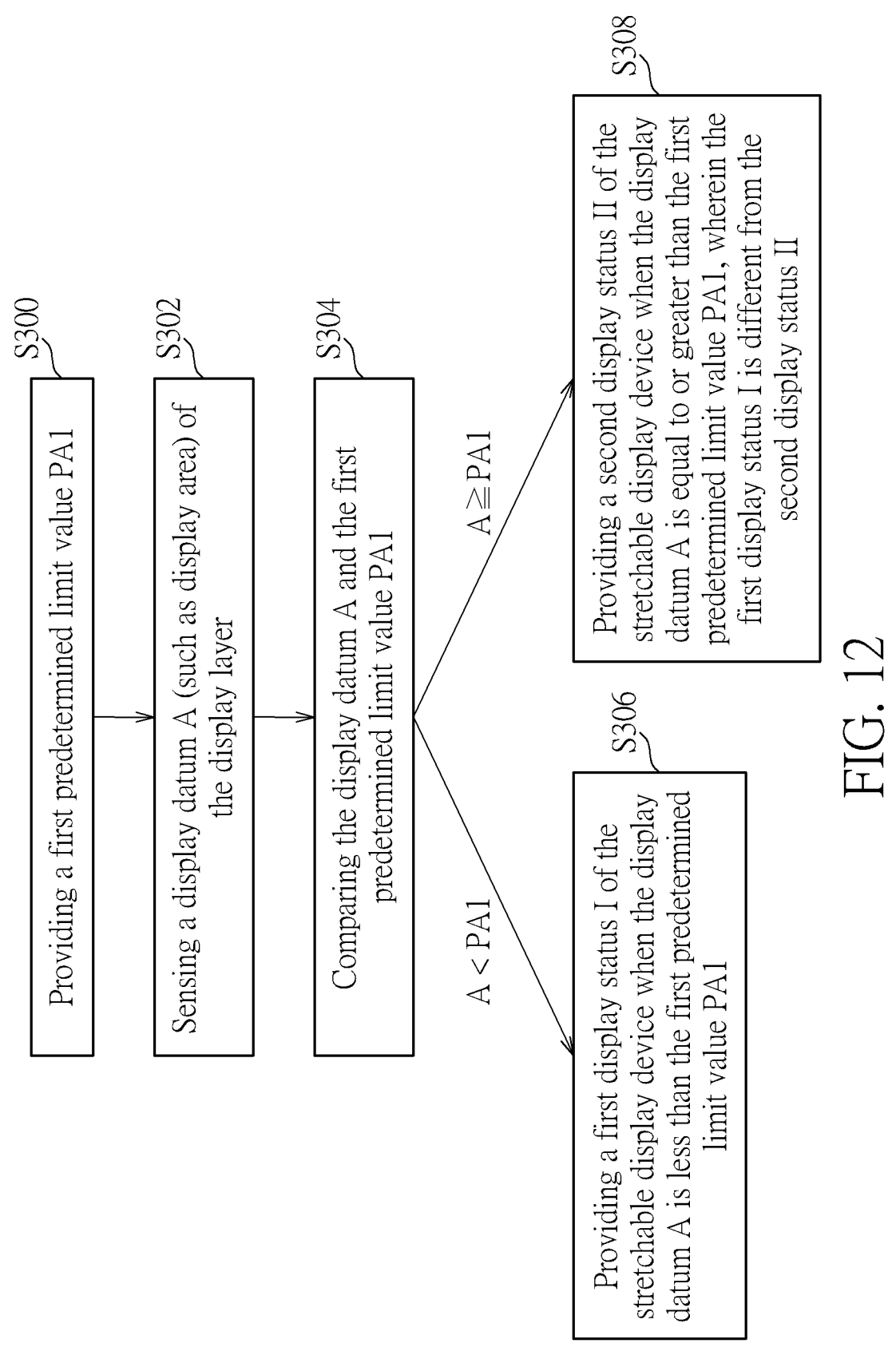
FIG. 12 is a flow chart showing a method of controlling the stretchable display device according to a variant embodiment of the first embodiment of the present disclosure.

Referring to FIG. 12, FIG. 12 is a flow chart showing a method of controlling the stretchable display device 100 according to a variant embodiment of the first embodiment of the present disclosure. The method may include following steps:

Step S300: Providing a first predetermined limit value PA1. For example, the first predetermined limit value PA1 may correspond to a value of area, but not limited thereto.

Step S302: Sensing a display datum A (such as the display area, the second area A2) of the display layer 104.

Step S304: Comparing the display datum A and the first predetermined limit value PA1.

Step S306: Providing a first display status I of the stretchable display device 100 when the display datum A is less than the first predetermined limit value PA1 (A<PA1).

Step S308: Providing a second display status II of the stretchable display device 100 when the display datum A is equal to or greater than the first predetermined limit value PA1 (A≥PA1), wherein the first display status I is different from the second display status II.

Accordingly, the stretchable display device 100 will be maintained in the first display status I until it is stretched to reach that condition that the display datum A is greater than or equal to the predetermined limit value PA1.

The stretchable display device and method of controlling the stretchable display device of the present disclosure are not limited by the aforementioned embodiment, and may have other different embodiments and variant embodiments. To simplify the description, the identical components in each of the following embodiments are marked with identical symbols. For making it easier to compare the difference between the embodiments, the following description will detail the dissimilarities among different embodiments and the identical features will not be redundantly described. In addition, the material and thickness of each film or layer and related fabrication process or conditions of the present disclosure may refer to the first embodiment and related variant embodiment, which will not be repeated.

Figure 5:
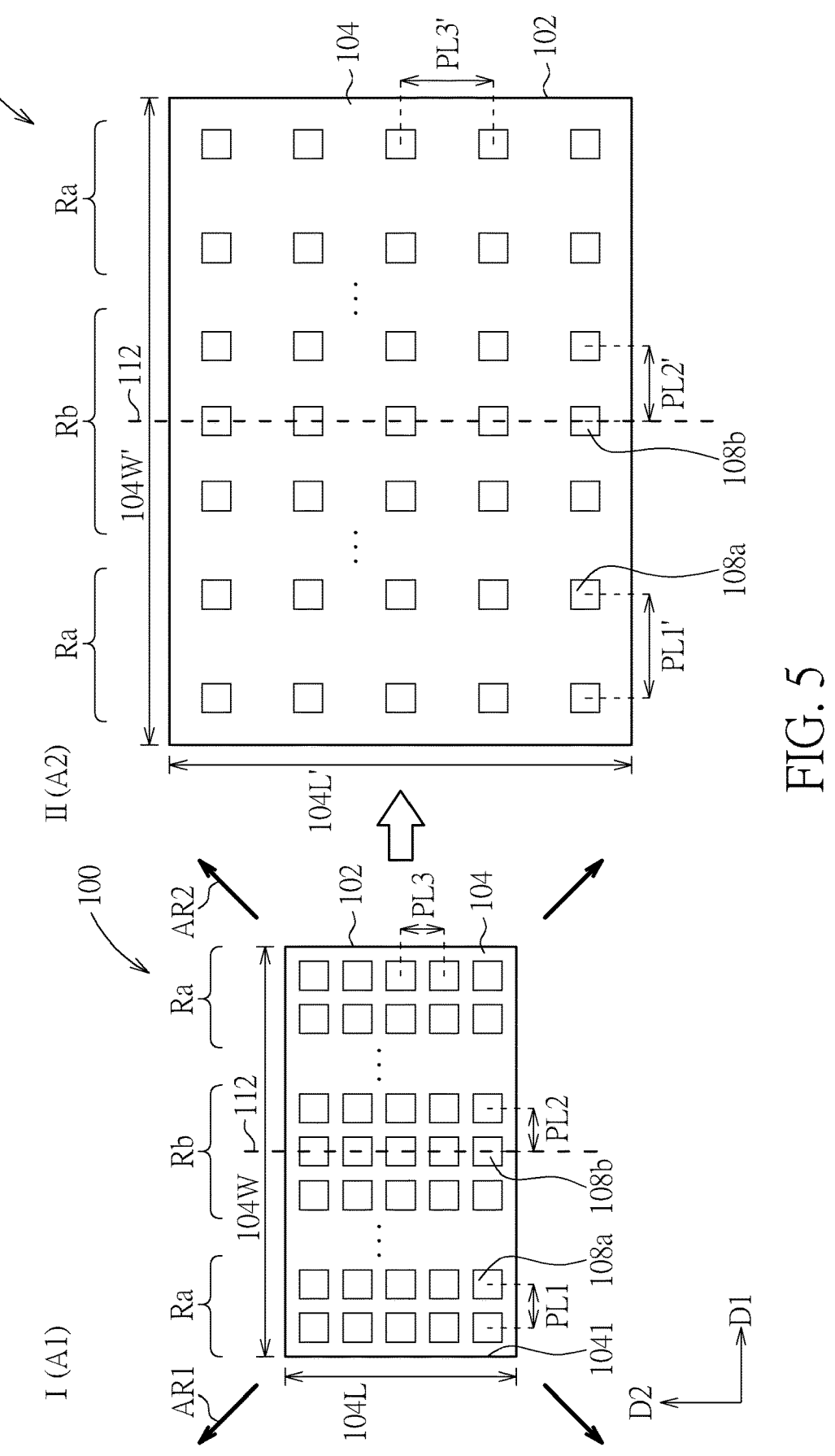
FIG. 5 is a schematic diagram illustrating different display statuses of a stretchable display device according to a second embodiment of the present disclosure

Referring to FIG. 5, FIG. 5 is a schematic diagram illustrating different display statuses of a stretchable display device according to a second embodiment of the present disclosure. In some embodiments, the stretchable display device 100 may be stretched along two directions, as shown in the arrows AR1 and AR2, thus both the width 104W and the length 104L may be enlarged after stretching. When the display layer 104 of the stretchable display device 100 have the first area A1, the stretchable display device 100 is operated in the first display status I; when the display layer 104 of the stretchable display device 100 is stretched to have the second area A2, the stretchable display device 100 is operated in the second display status II. The stretched width 104W' in the second display status II is greater than the width 104W in the first display status I and the stretched length 104L' in the second display status II is greater than the length 104L in the first display status I. Furthermore, the distance between adjacent subpixel units 108a/108b may be greater in both the direction D1 and the direction D2. For example, in the direction D1, the first stretched distance PL1' and the second stretched distance PL2' of the second display status II may be greater than the first distance PL1 and the second distance PL2 of the first display status I. In the direction D2, two adjacent subpixel units 108a or 108b may have a third distance PL3 when the stretchable display device 100 is in the first display status I, and the same two adjacent subpixel units 108a or 108b may have a third stretched distance PL3' when the stretchable display device 100 is in the second display status II. After stretching, the third stretched distance PL3' may be greater than the third distance PL3. In some embodiments, the shape of the display layer 104 after stretching (meaning the shape of the second area A2) may be similar to the shape of the display layer 104 before stretching (meaning the shape of the first area A1), but not limited thereto. In some other embodiments, the shape of the second area A2 may be different from the shape of the first area A1. For example, the second area A2 may be any other shapes, such as trapezoid or regular or irregular polygons or geometric shapes.

Figure 6:
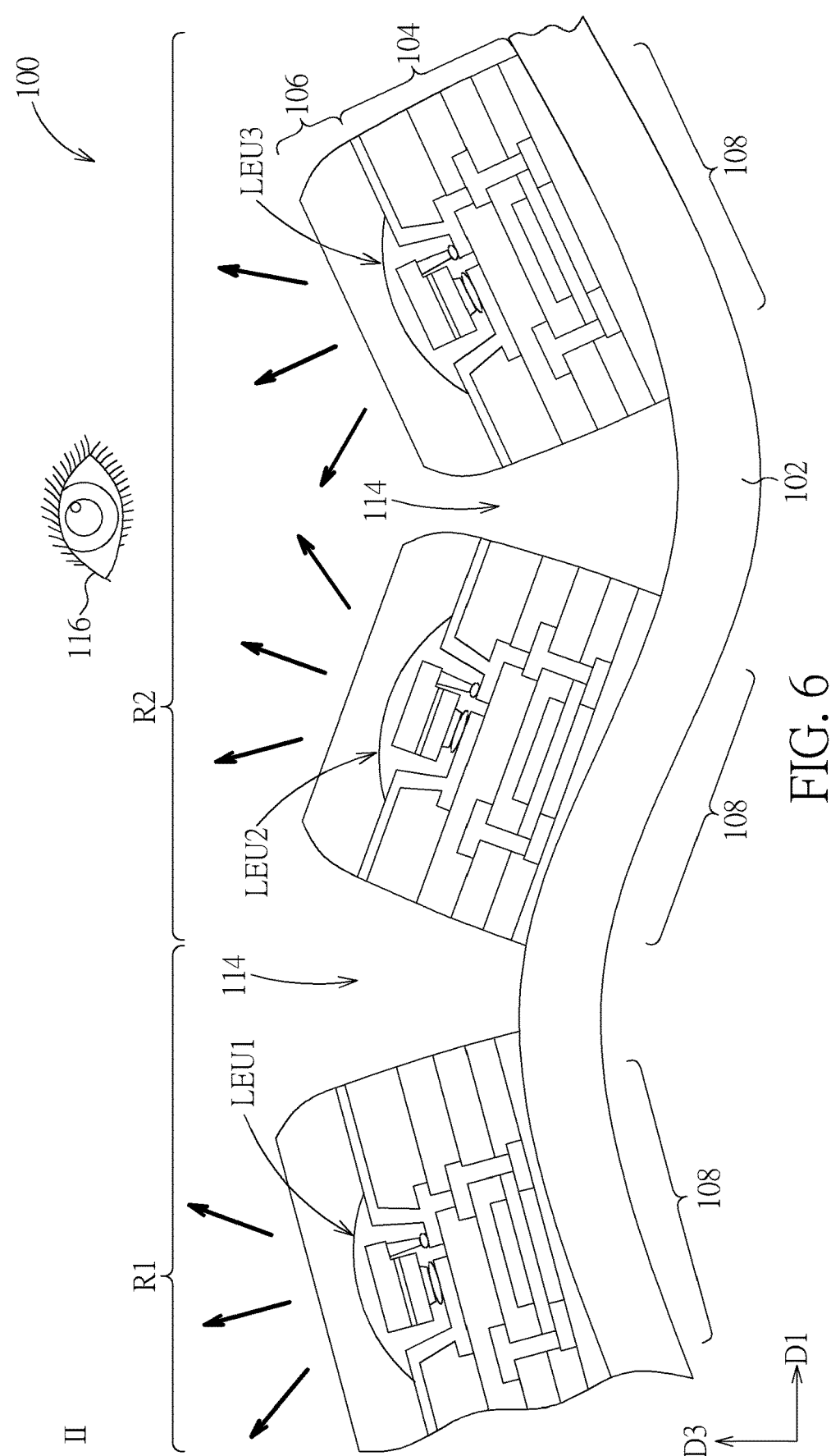
FIG. 6 is a schematic sectional-view diagram of the stretchable display device in a second display status according to a third embodiment of the present disclosure.

Referring to FIG. 6, FIG. 6 is a schematic sectional-view diagram of the stretchable display device in a second display status according to a third embodiment of the present disclosure, wherein the stretchable display device is operated in the second display status. In some embodiments, the stretchable display device 100 may be stretched along multiple directions (such as 3 directions). For example, the stretchable display device 100 may be stretched along the edges of the display layer 104 and also along a direction perpendicular to the surface of the stretchable substrate 102. After stretching, the stretchable display device 100 may become a curved display device that has at least one curved portion. In some embodiments, since the stretchable display device 100 in the second display status II may be curved after stretching, the luminance of the subpixel units 108 in different regions of the display layer 104 may be adjusted in order to provide a better display performance or better display mode for the user. For example, the user eye 116 may be detected by the stretchable display device 100 to determine which subpixel units 108 are closer to the user eye 116 and which subpixel units 108 are farther from the user eye 116. In FIG. 6, the subpixel unit 108 in the region R1 is farther from the user eye 116, and the subpixel units 108 in the region R2 are closer to the user eye 116. Therefore, the light emitting unit LEU1 of the subpixel unit 108 in the region R1 may have a luminance greater than the luminance of the light emitting units LEU2 and LEU3 of the subpixel units 108 in the region R2. In some embodiments, the luminance of the light emitting units LEU1, LEU2, LEU3 may be adjusted based on whether they are positioned in a curved portion. In some embodiments, the luminance of the light emitting units LEU1, LEU2, LEU3 may be adjusted based on whether the normal line of the portion of the stretchable substrate 102 where they are disposed directs toward the user eye 116. In some embodiments, the luminance of the light emitting units LEU1, LEU2, LEU3 may be adjusted based on whether their light emitting surfaces face the user eye 116. From the above, the luminance of different light emitting units LEU1, LEU2, LEU3 or different subpixel units 108 may be independent and may not be complete identical. The luminance of different light emitting units LEU1, LEU2, LEU3 or different subpixel units 108 may be modified or adjusted according to different requirements or display statuses.

Figure 7:
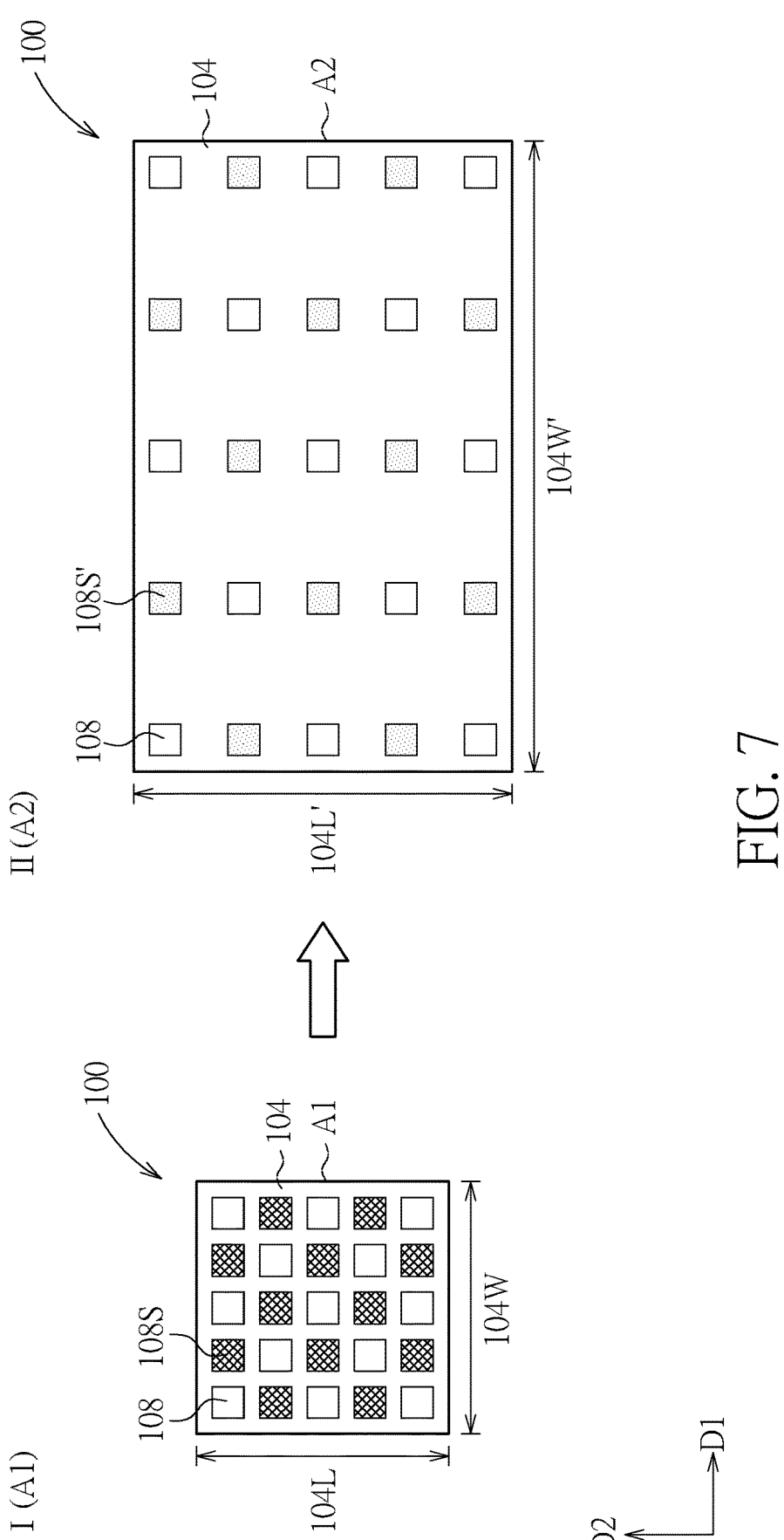
FIG. 7 is a schematic diagram illustrating different display statuses of a stretchable display device according to a fourth embodiment of the present disclosure.

Referring to FIG. 7, FIG. 7 is a schematic diagram illustrating different display statuses of a stretchable display device according to a fourth embodiment of the present disclosure. According to some embodiments, in addition to a plurality of subpixel units 108, the display layer 104 further includes a plurality of assistant subpixel units 108S. When the stretchable display device 100 is in a first display status I, i.e., the display layer 104 has a first area A1, the subpixel units 108 are effective (such as in a turned-on state), but the assistant subpixel units 108S are non-effective (such as in a turned-off state). After the display layer 104 is stretched to have a second area A2 and the stretchable display device 100 is switched to the second display status II, the assistant subpixel units 108S will be effective (marked by the symbol "108S"). For example, the effective assistant subpixel units 108S' may be turned on in the second display status II. In such design, a second average luminance AL2 of the second display status II can be equal to or greater than the first average luminance AL1 in the first display status I. For example, the second average luminance AL2 may be greater than the first average luminance. The disposition of the assistant subpixel units 108S/108S' may adjust the average luminance of the stretchable display device 100. For instance, the average luminance can be adjusted to reduce the deviation of the luminance perception of human eyes between the first display status I and the second display status II. In addition, the PPI value of the first display status I (represented by PPI1) may be different form the PPI value of the second display status II (represented by PPI2) in some embodiments. For example, PPI1 may be greater than PPI2, but not limited thereto. In some embodiments, the PPI2/PPI1 value may be greater than 0.5 and less than 1. Such design can maintain a less PPI variation between the first display status I and the second display status II. In another aspect, the stretchable display device 100 can be stretched along at least two directions, such as along the direction D1 and the direction D2. After being stretched, both the stretched length 104L' and the stretched width 104W' of the second area A2 may be greater than the un-stretched length 104L and the un-stretched width 104W of the first area A1 in the first display status I, but not limited thereto.

Figure 8:
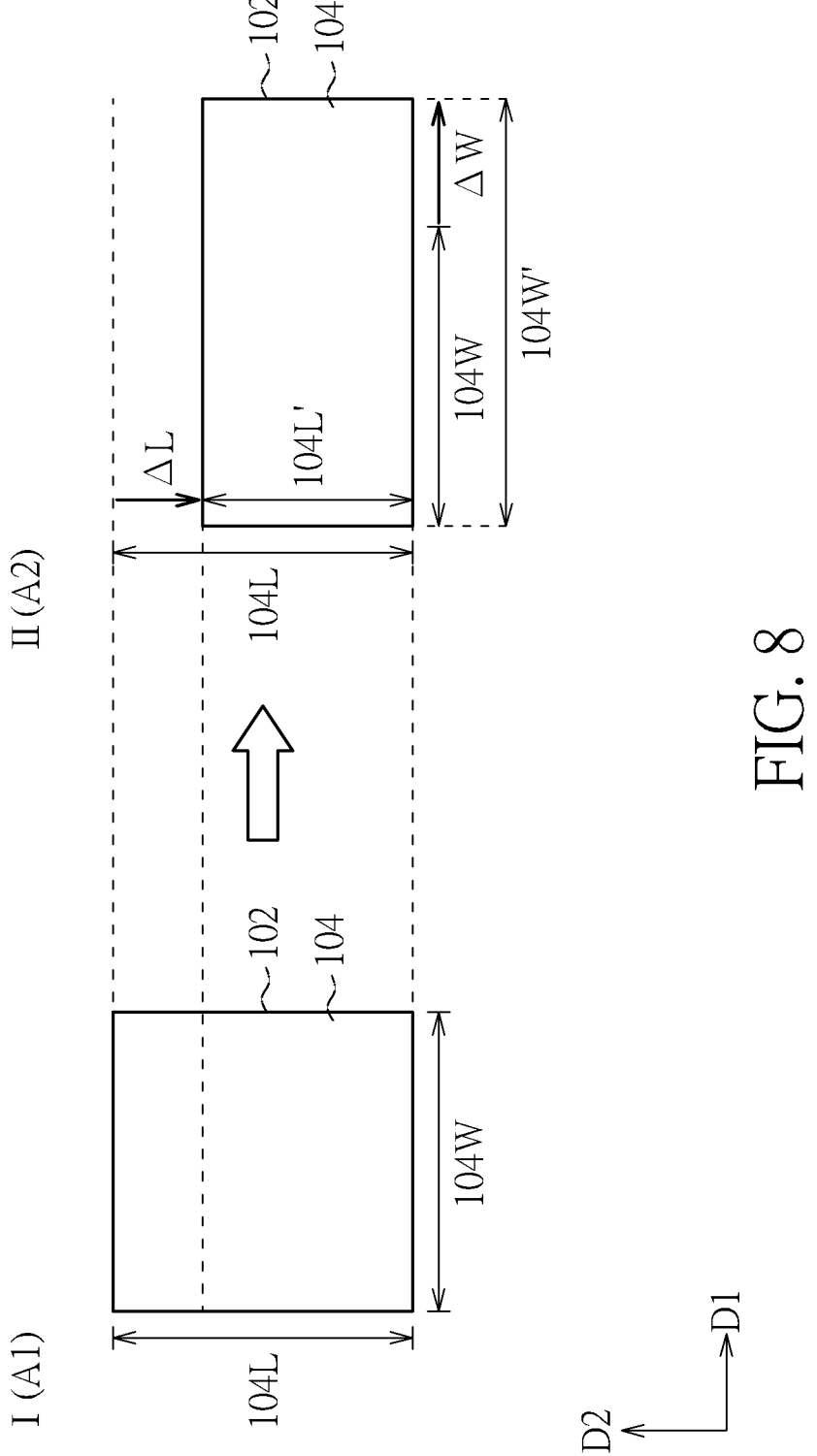
FIG. 8 is a schematic diagram illustrating different display statuses of a stretchable display device according to a fifth embodiment of the present disclosure.

Referring to FIG. 8, FIG. 8 is a schematic diagram illustrating different display statuses of a stretchable display device according to a fifth embodiment of the present disclosure. In some embodiments, the stretchable display device 100 may be designed to have a property that when the display layer 104 is enlarged along a direction, the display layer 104 will shrink in another direction. As an exemplary embodiment shown in FIG. 8, in the first display status I, the display layer 104 has a first area A1 with a width 104W in the direction D1 and a length 104L in the direction D2. When the display layer 104 is stretched and the width of the display layer 104 along the direction D1 is enlarged from the width 104W to the enlarged width 104W', the length will be shrunk from the length 104L to the shrunk length 104L' in the direction D2. In some embodiments, the variation of the length and width of the display layer 104 may meet, but not limited to, the following equations:

$$104W' = 104W + \Delta W;$$

$$104L' = 104L - \Delta L;$$

and $$\Delta L = \Delta W.$$

This design may provide a protection mechanism to the stretchable substrate 102, such as to prevent the stretchable substrate 102 being over stretched (over enlarged or over shrunk) in different directions at the same time and/or mitigating the damage of the stretchable substrate 102 resulted from great stress variation when being stretched.

Figure 9:
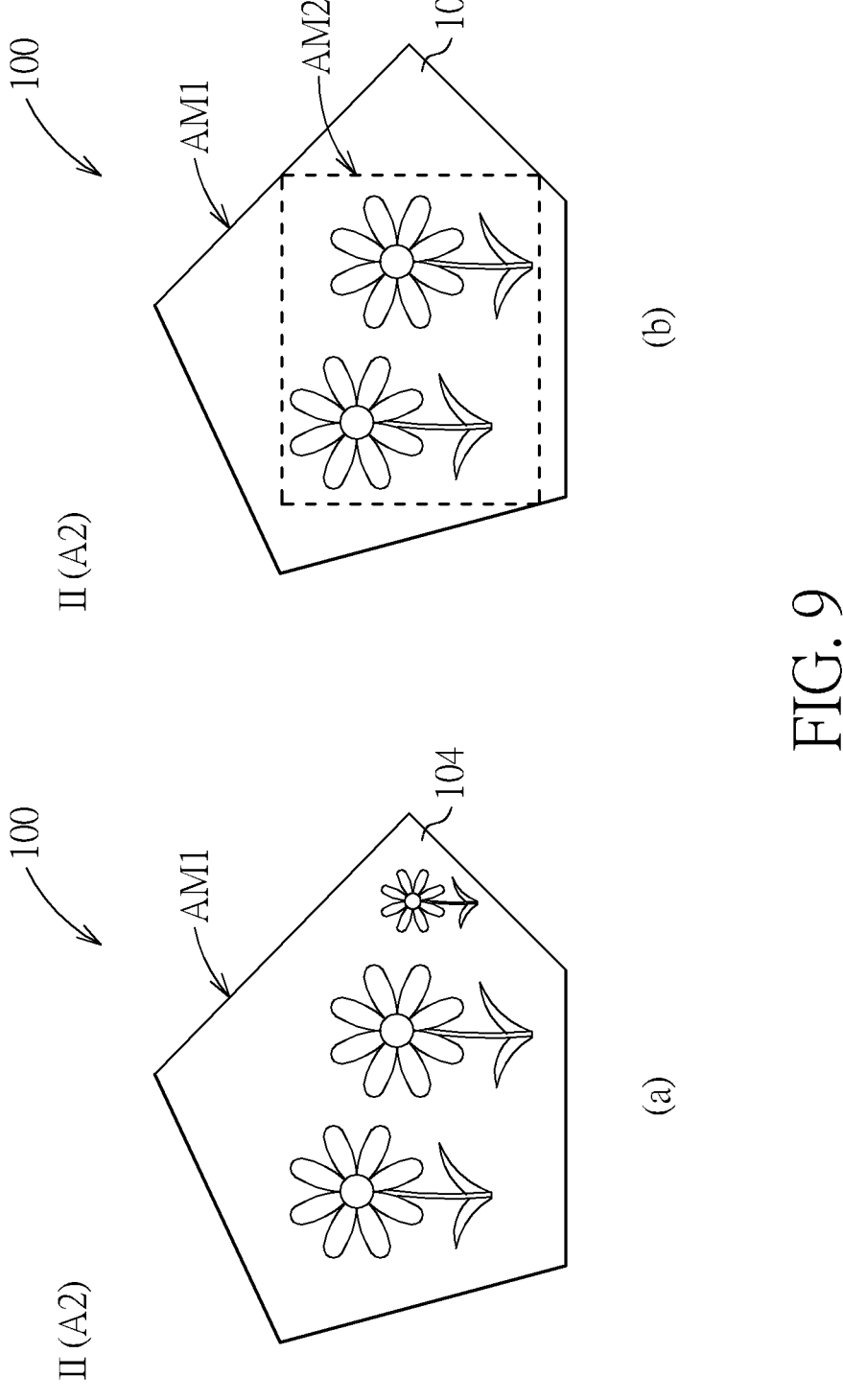
FIG. 9 is a schematic diagram illustrating different display modes of a stretchable display device according to a sixth embodiment of the present disclosure.

Referring to FIG. 9, FIG. 9 is a schematic diagram illustrating different display modes of a stretchable display device according to a sixth embodiment of the present disclosure. In some embodiments, the stretchable display device 100 may be stretched to have a second area A2 with an irregular geometric shape or an irregular polygon rather than rectangular. In the second display status II, the stretchable display device 100 may have two or more display modes. As shown in the part (a) of FIG. 9, a first mode is illustrated that the image is full-screen displayed in a first display area AM1 that occupies the whole display region (the second area A2 of the display layer 104). In the part (b) of FIG. 9, a second mode is illustrated that the image is displayed in a rectangular display region, which is a second display area AM2 and smaller than the whole second area A2. The stretchable display device 100 may figure out a preferred display area for displaying the image according to the provided image data. For example, when the image has irregular shape, it can be displayed in the first display mode; when the image has a rectangular shape, the largest rectangular display area may be figured out for display the rectangular image based on a predetermined algorithm, but not limited thereto.

Figure 10:
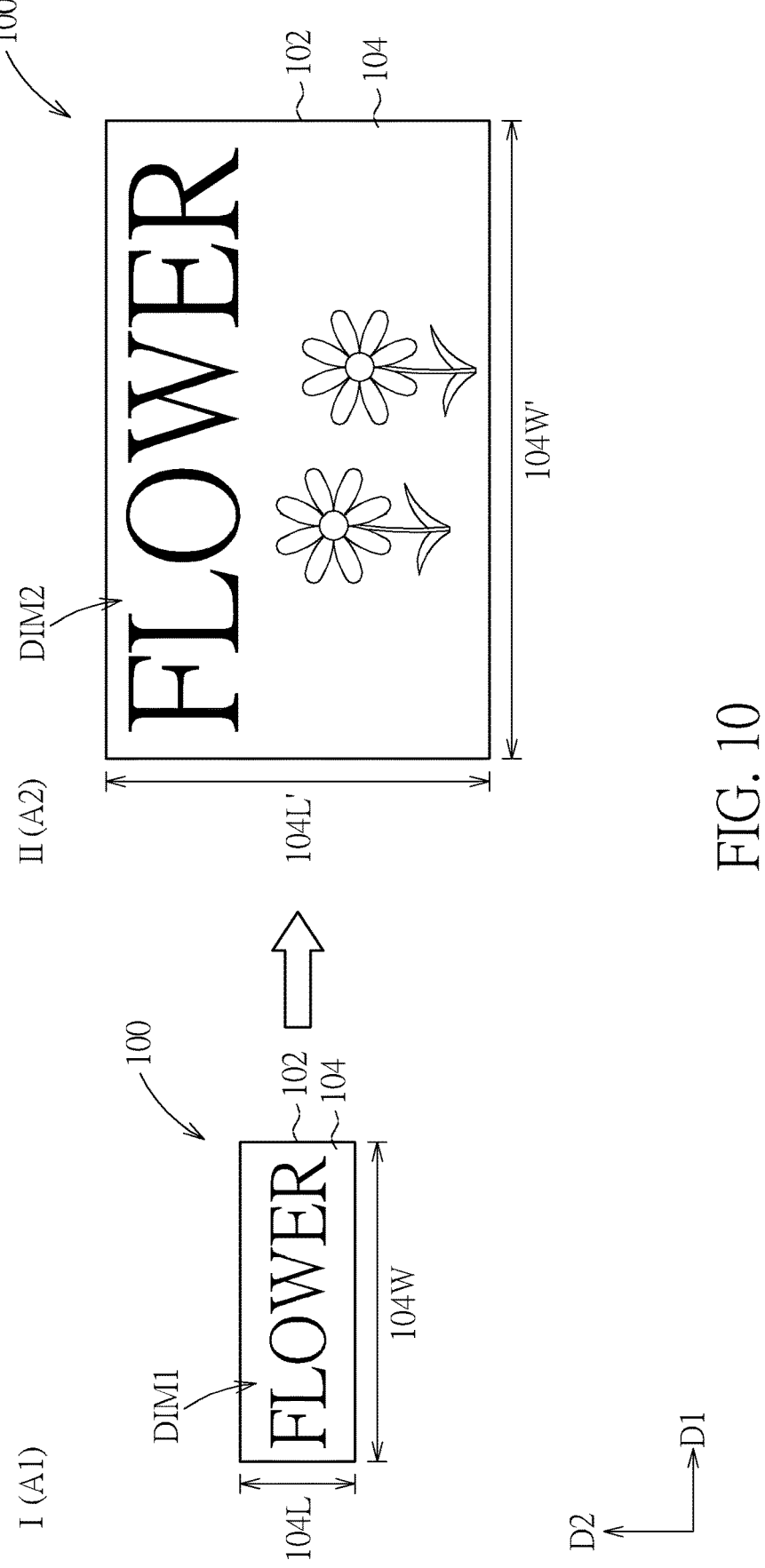
FIG. 10 is a schematic diagram illustrating different display statuses of a stretchable display device according to a seventh embodiment of the present disclosure.

Referring to FIG. 10, FIG. 10 is a schematic diagram illustrating different display statuses of a stretchable display device according to a seventh embodiment of the present disclosure. In some embodiments, the first status I and the second status II of the stretchable display device 100 may display non-identical images according to the length-width ratio of the area of the display layer 104. For example, the length-width ratio 104L/104W (such as 9:21) of the first area A1 may be different from the length-width ratio 104L'/ 104W' (such as 9:16) of the second area A2, and the stretchable display device 100 may detect the different length-width ratio to provide different images with different length-width ratio and/or different information corresponding to the length-width ratio. In some embodiments, the first display status I may provide simpler and/or less information or partial image data and the second display status II may provide the complete information or whole picture of the image data, but not limited thereto. In other words, the stretchable display device 100 displays a first display image DIM1 when the display layer 104 has the first area A1 and displays a second display image DIM2 when the display layer 104 has the second area A2, and the first display image DIM1 may be different from the second display image DIM2.

More embodiments of the methods of controlling the stretchable display device will be introduced below. The first display status and the second display status mentioned below may refer to any one of the designs mentioned in the previous embodiments.

Figure 14:
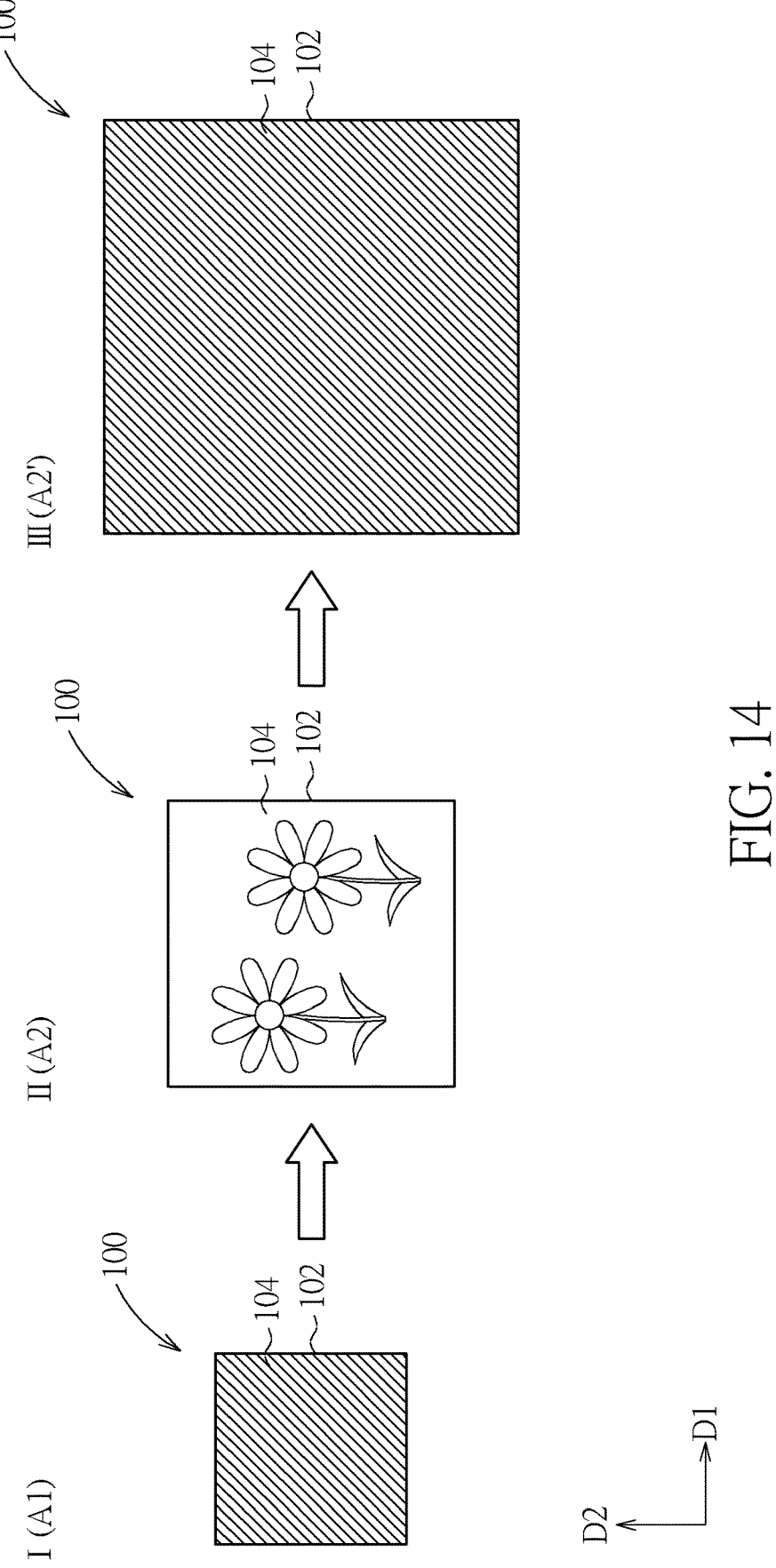
FIG. 14 is a schematic diagram illustrating different display statuses of the stretchable display device according to the eighth embodiment of the present disclosure.

Referring to FIG. 13 and FIG. 14, FIG. 13 is a flow chart showing a method of controlling the stretchable display device 100 according to an eighth embodiment of the present disclosure, and FIG. 14 is a schematic diagram illustrating different display statuses of the stretchable display device according to the eighth embodiment of the present disclosure. The method includes following steps:

Step S400: Providing the stretchable display device 100 including a display layer 104 having a first area A1 when the stretchable substrate 102 is not stretched. The stretchable display device 100 is in a first display status I. For example, the first display status is in an off state.

Step S402: Providing a first predetermined limit value PER1 and a second predetermined limit value PER2, wherein the first predetermined limit value PER1 is less than the second predetermined limit value PER2. For example, the first predetermined limit value PER1 is 1 and the second predetermined limit value PER2 is 25. The second predetermined limit value PER2 may range from 20 to 30.

Step S404: Sensing the area (such as a second area A2) or an area difference $\Delta A$ of the stretchable display device 100 when the area is changed, wherein the area difference $\Delta A$ may be the absolute difference of the first area A1 and the second area A2.

Step S406: Providing a stretching ratio ER from the first area A1 and the second area A2, wherein the stretching ratio ER is a ratio of the area difference $\Delta A$ to the first area A1 (ER=$\Delta A$/A1). Comparing the stretching ratio ER with the first predetermined limit value PER1 and the second predetermined limit value PER2.

Step S408: Keeping the first display status I of the stretchable display device 100 when the stretching ratio ER is less than the first predetermined limit value PER1 (ER<PA1).

Step S410: Providing a second display status II of the stretchable display device 100 when the stretching ratio ER is equal to or greater than the first predetermined limit value PER1 but less than or equal to the second predetermined limit value PER2. For example, the display layer 104 has the stretched second area A2 and the second display status II is an on state. In other words, at least some of the plurality of subpixel units of the display layer is turned on when the stretching ratio ER is less than or equal to the second predetermined limit value PER2.

Step S412: Providing a third display status III of the stretchable display device 100 when the stretching ratio ER is greater than the second predetermined limit value PER2. For example, the display layer 104 has the stretched second area A2' and the third display status III is an off state, wherein the stretched second area A2' is greater than the stretched second area A2. In other words, when the stretching ratio ER is greater than the second predetermined limit value PER2, the stretchable display device 100 may be turned off.

The design of the third display status III is to provide a protection mechanism for the stretchable display device 100. If the stretchable display device 100 is over-stretched such as the stretched second area A2' is too large, the protection mechanism will be activated and the display will be turned-off.

In another saying, the stretchable display device 100 may be stretched from the second area A2 to a third area (which can also be represented by the symbol A2' in FIG. 14), and the stretchable display device 100 can be operated in a third display status III, such as an off state, when the display layer 104 has the third area.

Referring to FIG. 15, FIG. 15 is a flow chart showing a method of controlling the stretchable display device 100 according to a ninth embodiment of the present disclosure. The method includes following steps:

Step S500: Providing the stretchable display device 100 including a display layer 104 having a first area A1 when the stretchable substrate 102 is not stretched. The stretchable display device 100 is in a first display status I. For example, the first display status is in an off state.

Step S502: When the stretchable display device 100 is being stretched, detecting the stretching direction.

Step S504: IF the stretching direction meets a predetermined force direction, perform Step S506; if not, go back to Step S500.

Step S506: Detecting the stretching force.

Step S508: IF the stretching force meets a predetermined force range, perform Step S510; if not, go back to Step S500.

Step S510: Providing a second display status II of the stretchable display device 100. For example, the second display status II is an on state.

According to some embodiments, the stretchable display device can be stretched along at least one direction, and the average luminance of the stretched display device with a stretched area may be different from the average luminance when the stretchable display device has another area. According to some embodiments, the adjustment of the average luminance may provide desired performance.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A curvature variable device, comprising:
a curvature variable substrate; and
a display layer disposed on the curvature variation substrate,
wherein the curvature variable device is configured to have a first average luminance when operated in a first display status, and is configured to have a second average luminance when operated in a second display status;
wherein the curvature variable device comprises at least one curved portion when operated in the second display status, and the first average luminance is different from the second average luminance;
wherein one of the first display status and the second display status is in an off state, and another of the first display status and the second display status is in an on state; and
wherein in the off state, the curvature variable device displays no image.

2. The curvature variable device of claim 1, wherein the curvature variable substrate comprises at least one curved portion when the curvature variable device is operated in the second display status.

3. The curvature variable device of claim 1, wherein when the curvature variable device is operated in the first display status, the display layer has a first area, when the curvature variable device is operated in the second display status, the display layer has a second area, and the first area is different from the second area.

4. The curvature variable device of claim 3, wherein a length-width ratio of the first area is different from a length-width ratio of the second area.

5. The curvature variable device of claim 1, wherein the display layer comprises a plurality of subpixel units, and at least one of the plurality of subpixel units comprises a light emitting element.

6. The curvature variable device of claim 5, wherein the at least one of the plurality of subpixel units comprises a switching element electrically connected to the light emitting element.

7. The curvature variable device of claim 1, wherein the display layer comprises a first region and a second region, a distance between the first region and a user is different from a distance between the second region and the user, and an average luminance of the first region is different from an average luminance of the second region.

8. The curvature variable device of claim 5, wherein the plurality of subpixel units comprises a first subpixel unit and a second subpixel unit disposed adjacent to the first subpixel unit, when the curvature variable device is operated in the first display status, a first distance is between the first subpixel unit and the second subpixel unit, when the curvature variable device is operated in the second display status, a second distance is between the first subpixel unit and the second subpixel unit, and the first distance is different from the second distance.

9. The curvature variable device of claim 8, wherein the curvature variable device is capable of being switchable between the first display status and the second display status.

10. The curvature variable device of claim 1, wherein the curvature variable device has an edge region and a middle region, the display layer comprises a plurality of subpixel units, the display layer has a first area in the first display status, the display layer has a second area in the second display status, and the second area is greater than the first area,
wherein when the curvature variable device is operated in the first display status, a distance between two adjacent ones of the subpixel units in the edge region is equal to a distance between two adjacent ones of the subpixel units in the middle region, and when the curvature variable device is operated in the second display status, the distance between the two adjacent ones of the subpixel units in the edge region is different from the distance between the two adjacent ones of the subpixel units in the middle region.

11. The curvature variable device of claim 1, wherein the curvature variable device is capable of being switchable between the first display status and the second display status.

* * * * *